(12) United States Patent
Hoard et al.

(10) Patent No.: US 9,219,735 B2
(45) Date of Patent: *Dec. 22, 2015

(54) PROTECTING ONLINE MEETING ACCESS USING SECURE PERSONAL UNIVERSAL RESOURCE LOCATORS

(71) Applicant: International Business Machines Corporation, Armonk, NY (US)

(72) Inventors: Douglas G. Hoard, Lexington, KY (US); William M. Quinn, Lexington, KY (US)

(73) Assignee: International Business Machines Corporation, Armonk, NY (US)

( * ) Notice: Subject to any disclaimer, the term of this patent is extended or adjusted under 35 U.S.C. 154(b) by 163 days.

This patent is subject to a terminal disclaimer.

(21) Appl. No.: 13/740,454

(22) Filed: Jan. 14, 2013

(65) Prior Publication Data
US 2014/0096266 A1    Apr. 3, 2014

Related U.S. Application Data

(63) Continuation of application No. 13/632,662, filed on Oct. 1, 2012.

(51) Int. Cl.
  *H04L 29/06* (2006.01)
  *H04L 29/08* (2006.01)

(52) U.S. Cl.
  CPC ............ *H04L 63/10* (2013.01); *H04L 63/0428* (2013.01); *H04L 63/168* (2013.01); *H04L 67/02* (2013.01)

(58) Field of Classification Search
  USPC ........................................................ 726/28
  See application file for complete search history.

(56) References Cited

U.S. PATENT DOCUMENTS

| | | | | |
|---|---|---|---|---|
| 6,389,460 | B1 * | 5/2002 | Stewart et al. | 709/217 |
| 7,167,898 | B2 * | 1/2007 | Sato et al. | 709/204 |
| 7,406,593 | B2 | 7/2008 | Rabin et al. | |
| 8,462,955 | B2 | 6/2013 | Ureche et al. | |
| 8,566,462 | B2 * | 10/2013 | Jun et al. | 709/229 |

(Continued)

OTHER PUBLICATIONS

Zhang, Jianbiao, et al. "An improved anti-leech mechanism based on session identifier." Fourth International Conference on Machine Vision (ICMV 11). International Society for Optics and Photonics, 2012.*

(Continued)

*Primary Examiner* — Harris C Wang
(74) *Attorney, Agent, or Firm* — Robert H. Frantz; David B. Woycechowsky; Jeffrey S. La Baw

(57) ABSTRACT

Access to online collaborative resources such as an online meeting, web conference, online chat room, an online video conference, an online audio conference, a collaboratively edited document, a collaborative browsing session, an online social networking group, or a web site is secured by providing a first user-specific URL to a first user for addressing collaborative resource; responsive to the first user accessing the first user-specific URL, granting by a computing system access to the collaborative event to the first user; and responsive to a second user accessing the first user-specific URL, preventing by a computing system access to the collaborative event to the second user. Optionally, time criteria for accessing the first user-specific URL may be used to invalidating the first user-specific URL, wherein access to the collaborative resource is disabled.

9 Claims, 5 Drawing Sheets

(56) References Cited

U.S. PATENT DOCUMENTS

| | | | |
|---|---|---|---|
| 8,855,285 B1* | 10/2014 | Bracken et al. | 379/202.01 |
| 2002/0120757 A1* | 8/2002 | Sutherland et al. | 709/229 |
| 2004/0167987 A1* | 8/2004 | Reese et al. | 709/238 |
| 2006/0184997 A1* | 8/2006 | La Rotonda et al. | 726/2 |
| 2008/0052488 A1* | 2/2008 | Fritz et al. | 711/216 |
| 2008/0244027 A1* | 10/2008 | Foulger et al. | 709/206 |
| 2009/0193513 A1* | 7/2009 | Agarwal et al. | 726/15 |
| 2009/0199285 A1* | 8/2009 | Agarwal et al. | 726/9 |
| 2011/0258326 A1 | 10/2011 | Hu et al. | |
| 2011/0282946 A1* | 11/2011 | Keohane et al. | 709/206 |
| 2012/0210448 A1* | 8/2012 | Vrancken et al. | 726/29 |
| 2012/0303830 A1 | 11/2012 | Tobioka | |
| 2012/0331529 A1 | 12/2012 | Ibel et al. | |
| 2013/0179941 A1* | 7/2013 | McGloin et al. | 726/3 |

OTHER PUBLICATIONS

USPTO; Examination Correspondence from a Related Patent Application, U.S. Appl. No. 13/632,662, filed Oct. 1, 2012 by Douglas G. Hoard.

USPTO; Reply to the Examiner responsive to first Office Action from a Related Patent Application, U.S. Appl. No. 13/632,662, filed Oct. 1, 2012 by Douglas G. Hoard.

USPTO;Examination Correspondence from a Related Patent Application, U.S. Appl. No. 13/632,662, filed Oct. 1, 2012 by Douglas Hoard.

Other Patent Literature: Proposed amendment to make claims allowable responsive to an Examiner-initiated telephone interview on Jun. 3, 2015 in a Related Patent Application, U.S. Appl. No. 13/632,662, filed Oct. 1, 2012 by Douglas G. Hoard.

Other Patent Literature: Notice of Allowance mailed on Jun. 12, 2015 in a Related Patent Application, U.S. Appl. No. 13/632,662, filed Oct. 1, 2012 by Douglas G. Hoard.

Fileburst, 'Fileburst Global Con Token Authentication User Guide V1.5', Jan. 28, 2010, Fileburst LLC, http://test.fileburst.com/protected/fileburst_tokenauth.pdf.

Clarke, I., et al 'Freenet: A Distributed Anonymous Information Storage and Retrieval System', 1998, Dept. of Numerical Analysis & CS, Royal Inst. of Tech'y, http://cs.brown.edu/courses/cs253/papers/Freenet-1.pdf.

* cited by examiner

PROTECTING ONLINE MEETING ACCESS USING SECURE PERSONAL UNIVERSAL RESOURCE LOCATORS

CROSS-REFERENCE TO RELATED APPLICATIONS (CLAIMING BENEFIT UNDER 35 U.S.C. 120)

This is a continuation application of Ser. No. 13/632,662, filed on Oct. 1, 2012, by Douglas Hoard.

FEDERALLY SPONSORED RESEARCH AND DEVELOPMENT STATEMENT

None.

MICROFICHE APPENDIX

Not applicable.

INCORPORATION BY REFERENCE

None.

FIELD OF THE INVENTION

The invention generally relates to protecting access to and participation in online collaborative sessions such as online meetings, web conferences, chat sessions, co-editing of documents in the cloud, etc.

BACKGROUND OF INVENTION

There is a wide variety of online collaborative sessions such as social web group discussion threads (asynchronous or synchronous), chat rooms, online meetings, web conferences, and presentations (e.g. WebEx™, GoToMeeting™, etc.), online training and educational classes (e.g. WizIQ™, Dim-Dim™, Blackboard™, etc.), and even online co-editing of documents (DropBox™, GoogleDocs™, etc.).

Sharing hyperlinks ("links") or universal resource locators (URLs) to on-line meeting rooms is a common scenario in an online collaboration environment. A potential user or participant may not be aware of the login information an ongoing virtual meeting, for example, so he or she may contact someone that is currently a participant in the online meeting room to ask for the meeting URL and password. The contacted participant might respond by sending to the potential user the URL to the online meeting room in the form of a forwarded electronic message (email, SMS, IM, etc.), or verbally via a phone call or online voice connection. For most scenarios, this makes sense, and doesn't cause any issue.

However, some critically sensitive online collaborative sessions may contain information that could be sensitive, confidential, or even illegal to share outside of a small group, such as information about a resource action, a company acquisition, or future earnings that have not been made public. Such sharing of information introduces legal, commercial and even national security ramifications, where an uninvited user who has been informed with enough information about the on-line meeting room (or document or thread, etc.), can join the on-line room, and thus not comply with any number of policies, legal or otherwise.

SUMMARY OF EXEMPLARY EMBODIMENTS OF THE INVENTION

Access to online collaborative resources such as an online meeting, web conference, online chat room, an online video conference, an online audio conference, a collaboratively edited document, a collaborative browsing session, an online social networking group, or a web site is secured by providing a first user-specific URL to a first user for addressing collaborative resource; responsive to the first user accessing the first user-specific URL, granting by a computing system access to the collaborative event to the first user; and responsive to a second user accessing the first user-specific URL, preventing by a computing system access to the collaborative event to the second user. Optionally, time criteria for accessing the first user-specific URL may be used to invalidating the first user-specific URL, wherein access to the collaborative resource is disabled.

BRIEF DESCRIPTION OF THE DRAWINGS

The description set forth herein is illustrated by the several drawings.

DETAILED DESCRIPTION OF EXEMPLARY EMBODIMENT(S) OF THE INVENTION

Figure 1:
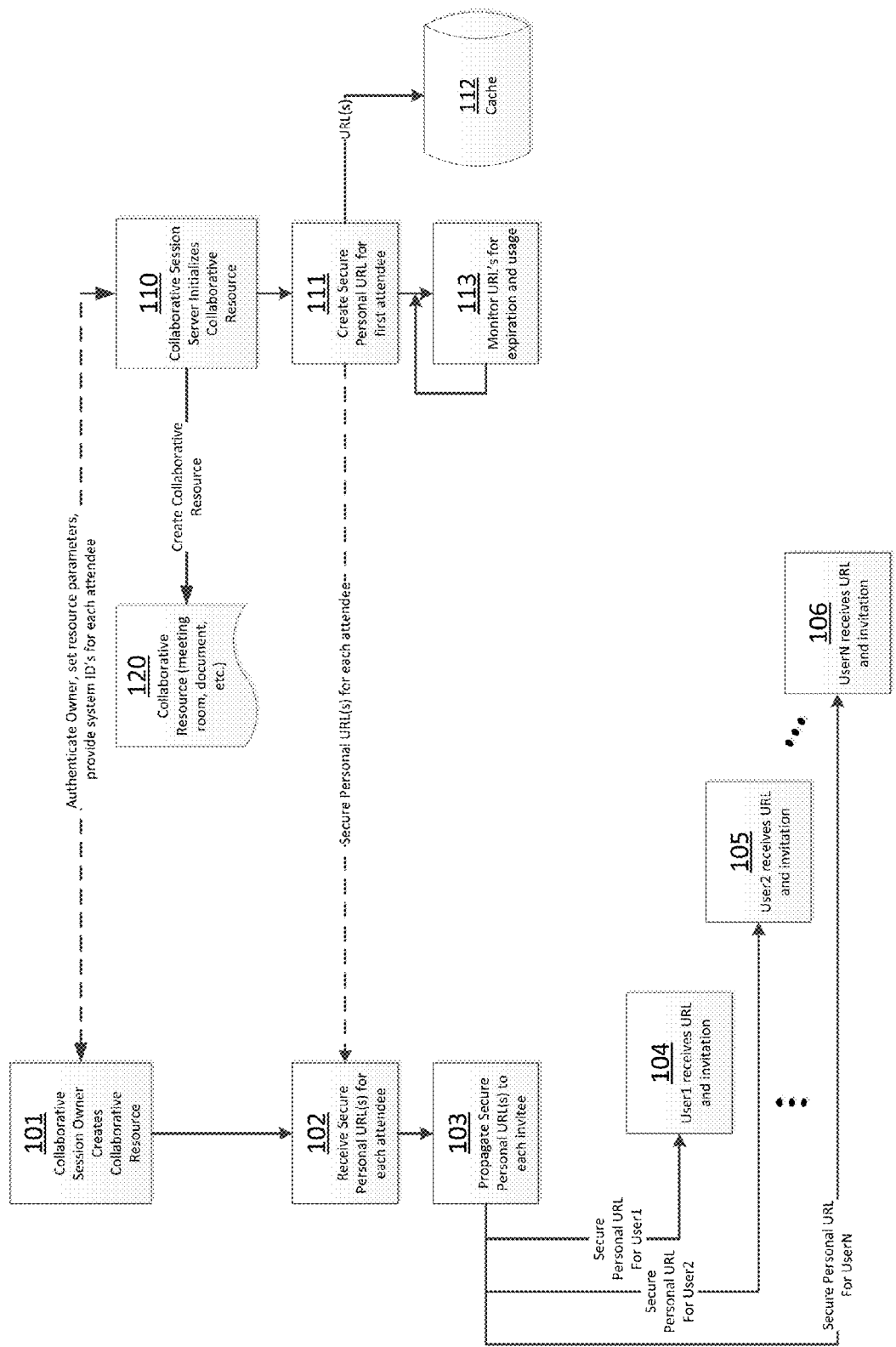
FIG. 1 provides illustrates the interactions according to the present invention between a collaborative session owner, a session server computer system, and one or more invitee systems to establish a collaborative resource (online meeting, co-edited document, etc.).

The inventors of the present and the related invention have recognized problems not yet recognized by those skilled in the relevant arts. Use of universal resource locators (URL's) and passwords in the ordinary manner for online collaborative sessions as described in the Background section of this disclosure can pose potential risks to legal compliance, fiduciary responsibilities, and even national security matters. Even when an enterprise trusts its users, it is advisable to plan for "an internal threat actor", who might send login information for a virtual meeting, a closed group social discussion thread, or a shared document, such as a URL and a password, to a user who might find a way to spy on the meeting room. In the situation of a shared document, such a user could be mischievous and actually edit the document to insert incorrect information, delete useful information, or cause embarrassment to the author or authors.

So, the present inventors set out to develop an easy-to-use method and mechanism to invite a user to an on-line collaborative session, such as an online virtual meeting room, such that the invitee (and, a potential internal threat actor) cannot compromise the system by forwarding the on-line collaborative session access information to an unauthorized user.

In order to achieve this, the present inventors first reviewed the strengths and weaknesses of the present methods for controlling access to online collaborative sessions.

Access Control Lists (ACLs) and Passwords.

Some current systems approach the possibility of unauthorized access to an online collaborative session using ACLs (access control lists), with or without user passwords. An ACL is typically a list of authorized users, created in advance of the online collaborative session, and managed by the moderator or "owner" of the session, such as a manager of an online meeting room. While this is one option to control access to an online meeting room, it requires active management by the room manager. Typically, in such a scenario, an application program running on a collaboration server is provided for a room manager to look up a registered user and assign them to the ACL, but it's not typical to change these frequently and on-the-fly. Some weak points of ACL's are that they are usually fairly static and unchanging in nature, such that once a user has been granted access (e.g. added to the ACL), then they will have access as long as the online meeting room is available for use. This leaves a security hole in the system if the room manager does not remember to remove users from the ACL after a use of the online meeting room.

Additionally, the list of users is stored in a data store by the collaboration server system. In general, the search function of an online meeting room system must not show the rooms that are access controlled to users who do not have access. So, there results in performance bottlenecks due to ACLs, since the technology becomes much more complex to maintain, expensive to execute, and does not fit well with more dynamic use-cases.

Two other weak points for ACLs are cloud-based solutions with multi-tenant requirements, and dynamically changing user bases. In these cases, it can be hard, or impossible, to build a complete ACL, and so it's typically simpler to use a password, than to manage ACLs.

Passwords are typically assigned to online meeting rooms that contain sensitive information, and are used as an alternative or supplement to entries in ACLs. Among the weak points of passwords is that they are easily shared by users who know the password. A user (e.g. potential internal threat actor) can send the room information (name, URL and password) to an unauthorized user, thereby allowing the unauthorized user to view the information, and creating a non-compliance situation.

The inventors have, therefore, endeavored to provide a new solution which is easy to use, but which avoids these vulnerabilities, and which incorporates one or more of the following features in its various embodiments:

a. the URL for accessing the online collaborative session is a private value, as described in the following paragraphs;
b. embodiments avoid, where possible, the use of an ACL in order to eliminate staleness of its contents causing users to have continued access beyond their intended authorization period or session;
c. spoilage and time-out of each user's authorization is enabled so that on-going security is not reliant upon vigilance or maintenance by an owner or manager of the online collaborative session; and
d. embodiments can address a scenario in which a first user dynamically grants a second user access to a particular online collaborative session.

Embodiments of the present invention offer a new approach, so that sharing of the on-line meeting information can be achieved without compromising the security of the meeting room or other online collaborative session. This actually will allow easy access to the room for the authorized users, but if an internal threat actor attempts to propagate the access information either via a forwarded email, instant message, even unintentionally, there is no way for that information to allow another user to bypass the security or learn enough from the information to "spy" on the meeting room or other online collaborative session contents and proceedings.

An exemplary case would be for an online virtual meeting room owner to hide and password-protect or lock the meeting room using features already available in some virtual meeting services. Since the room owner never tells anyone the password to the room, even users who directly address the room will not be able to join, because of the lock, or password. However, when conditions change and the room owner needs to pull other users into this locked room (e.g. the room owner needs to invite a user into the room), a private and unique URL is generated for each specific user/invitee, which will only work for each specific user. Even for an internal threat actor, there would be no way for the invited user to discover or share any information which would enable a different user to join the on-line meeting room, since the password is only known by the room owner.

Furthermore, embodiments according to the present invention have a method for the URL to be short lived or only used once, so that if a URL is not accessed in a pre-configured amount of time or used one time during the allowed period, the URL becomes invalid for future attempts to access it. A user trying to attend via the spoiled or already-consumed URL at a later time will be denied access to the on-line meeting room. This automatic time-out has advantages over ACL's, since ACLs have to be manually managed.

Known approaches and solutions referenced in the foregoing paragraphs introduce user complexity, performance obstacles, and barriers for on-line meeting management and attendance in persistent online meetings. So, again, embodiments of the present invention provide a non-ACL-based method, which enables an easier way to invite a user to an online room or other collaborative session, such that the person invited cannot compromise the system, by sending the online room information to unauthorized people.

While the solution described herein may seem ideal and easy to understand, there are technical barriers which make implementation non-trivial. So, the present disclosure also includes details that describe these methods, and how the system works. Specifically, embodiments of the present invention show how the system can create unique and secure personal URLs, and then authorize access to only the person accessing the on-line meeting via the secure personal URL.

In today's on-line meeting screens, a user will enter a meeting name (or identifying code), and a meeting password. Embodiments of the present invention will ease the burden of requiring a meeting password that needs to be propagated to online meeting attendees as well as provide a secure way to prevent the online meeting information from being shared.

First, as illustrated in FIG. 1, a Session Owner will establish (101) an online collaborative session (120) through an interface to an online collaborative session server (110), such as using a web browser to access a management function of the session server to create a meeting room, by providing a room name and an access password. The password would only be required to be known by the Session Owner.

Next, the Session Owner will invite a user to the collaborative session, such as making an invitation to a virtual meeting room. When a Session Owner wants to invite a user into his or her room, they may enter the invitee's system identifier (e.g. the invited user's e-mail address, telephone number, employee number, etc.) into a form or component of the session server (110) that would take the room information and invitee information, and call an application programming interface (API) on the online collaboration session server (110) to generate (111) a specific URL for the invited user.

Figure 4:
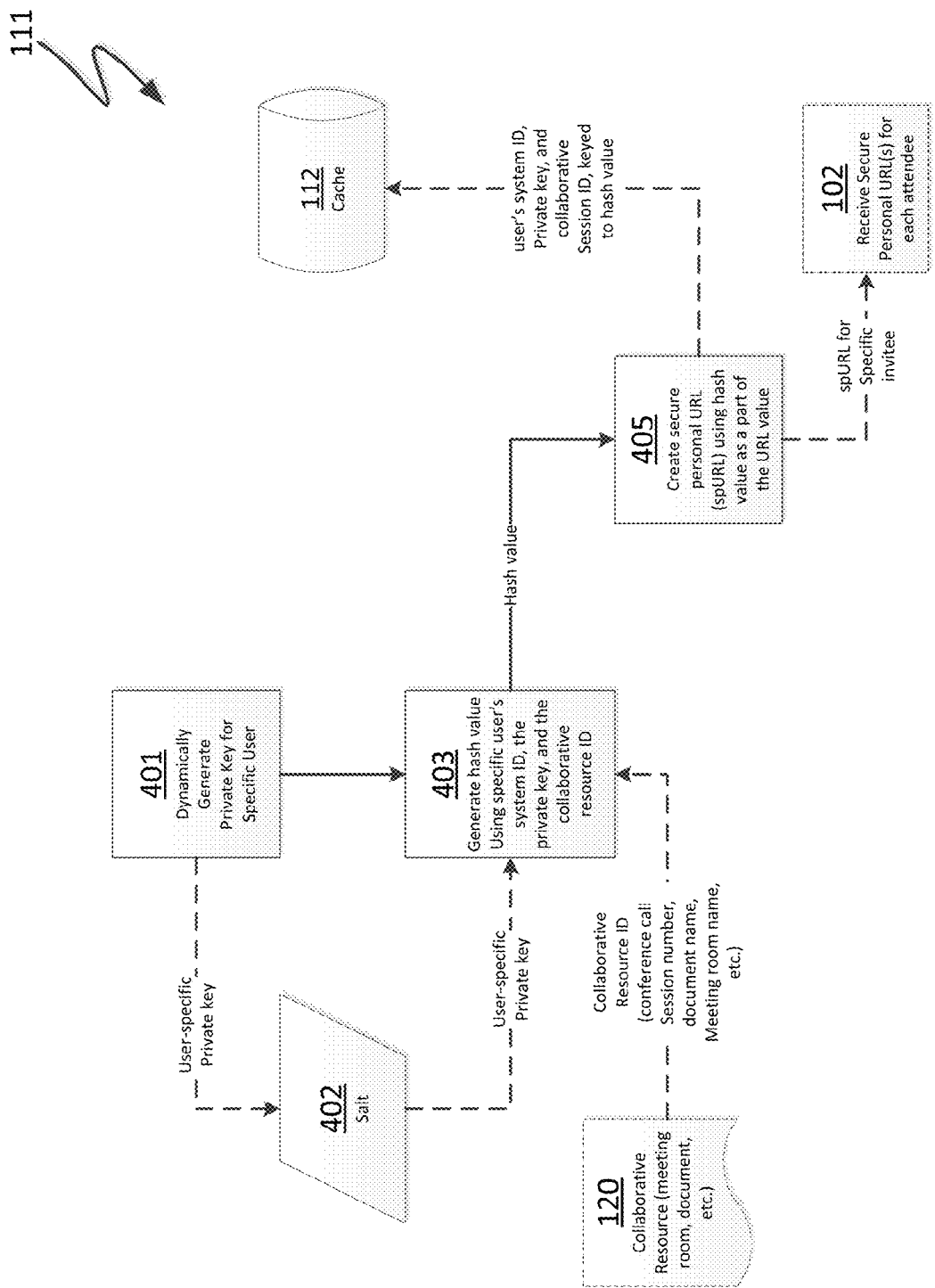
FIG. 4 depicts a logical process according to the present invention to create secure personal universal resource locator (spURL) values, to cache them, and to verify a spURL from a user requesting access to a collaborative resource.

Subsequently, a new component executed by the collaborative session server (110) will generate (111) a secure personal URL for invitee. Referring to FIG. 4, upon receiving the information from the session owner, the session server (110) would:

1. Authenticate that the session owner is truly the owner of the collaborative resource in question, otherwise, reject the request.
2. Generate a dynamic private key (403), to be later used as a "salt" (402).
3. Generate (403) a hash using the invitee's system identifier (e-mail address, telephone number, employee number, etc.), the dynamic private key (the salt), and roomId, using a strong and secure algorithm such as a secure hash algorithm (SHA-1, etc.).
4. Generate the personal URL (405), including the hash as part of the URL, so that the session server (110) can access the hash when the user joins using the URL.
5. Cache the information generated in step 3 for a period of time, using a secure cache (112), and using the hash as a key into the elements of the hash (userId, salt, roomId).
6. Return the generated "secure personal URL" to the session owner (102).

This process is repeated for each invitee, thereby creating a secure personal URL for each of the invitees. The session server may then begin to monitor (113) each of the secure personal URL's for usage, expiration and spoilage.

Referring again to FIG. 1, the Session Owner can propagate (103) the secure personal URLs (spURLs) to each of the invitees (104, 105, 106) via e-mail, instant message, verbally, or via another method. This process of generating, storing and propagating secure personal URL's would be repeated for each of the additional attendee's or invitees.

In order for an invited user to access the online collaborative session, such as to log into an online meeting room, the collaborative session server would first require the invitee to authenticate (201, 210) himself or herself into the session server system, such as through a log-in web page served from the online collaborative session server. But, this does not, by itself, allow the user access to the collaborative resource yet.

After successful authentication, the session server would perform the following logical processes:

1. It would first recognize the secure personal URL as a special type of URL. In most embodiments, this will be handled by an exception handler, as there will not likely be an actual available resource located at the secure personal URL address. When the server throws a "page not found" error, for example, an embodiment of the invention would then check the format of the URL. If the format is consistent with the format described in the foregoing generation steps, then the server would proceed with the following steps, otherwise, normal exception handling would proceed (e.g. sending page not found error to the user).
2. Responsive to determining the URL is of a format consistent with the secure personal URL format described in the foregoing paragraphs, the session server would extract the hash value from the secure personal URL and use it to look-up the cached (112) secure information used to create the hash.
3. Next, the server would verify secure information to the corresponding cached (211) information within the collaborative session system, such as an online meeting system. Specifically, in at least one embodiment, the server will attempt to recreate the hash based on the logged-in user's id, the cached salt, and the cached roomId.
4. If the information results in the same hash, then the invitee is instantly allowed (202) into the room, and the cache entry (112) may optionally be invalidated (212) to prevent re-entry (e.g. to enable one-time usage of the secure personal URL).
5. If the information is not found or produces a non-matching hash, the invitee is denied (203) access to the room, and optionally warned that their failed attempt to join has been logged.

Figure 2:
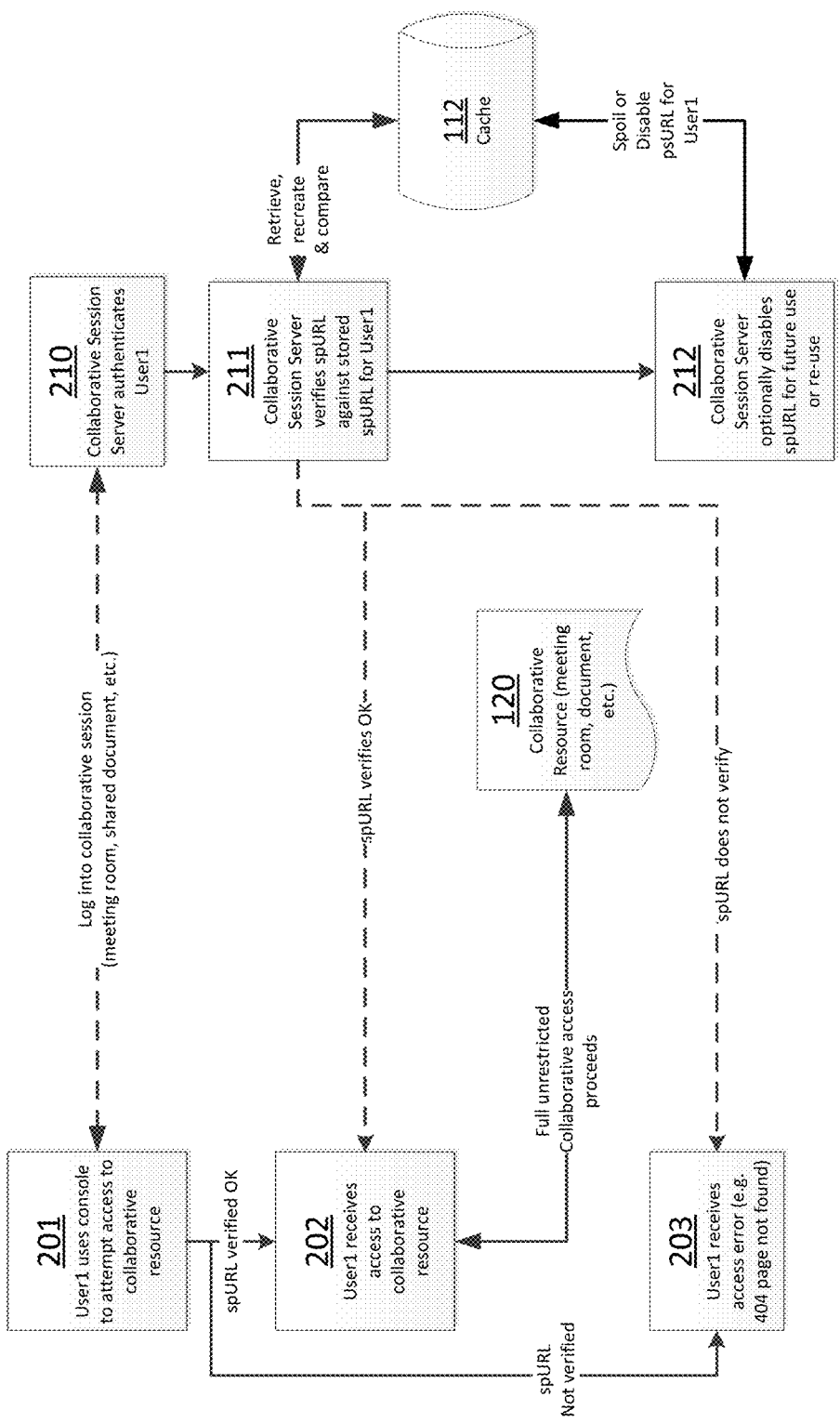
FIG. 2 shows a logical process according to the present invention to create a collaborative resource and one or more invitee secure personal URLs.
Figure 3:
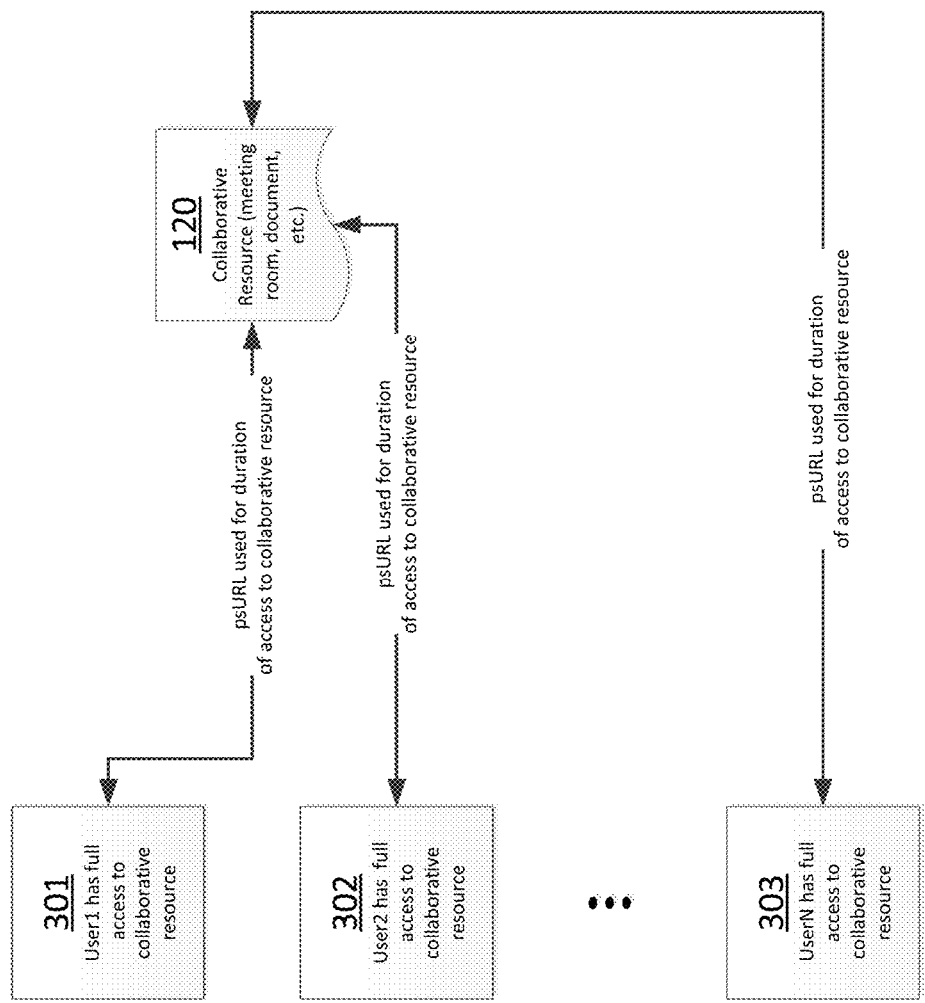
FIG. 3 sets forth a configuration and state of components according to the present invention in which a collaboration is achieved between multiple online users and a common resource.

Referring finally to FIG. 3, after each of the invitees has successfully completed the entry process of FIG. 2 using the spURL, a virtual conference between the users (301, 302, and 303) with the collaborative resource (120) is completed, such as conducting an online meeting, an online presentation, collaborative editing of a document, etc.

Suitable Computing Platform.

The preceding paragraphs have set forth example logical processes according to the present invention, which, when coupled with processing hardware, embody systems according to the present invention, and which, when coupled with tangible, computer readable memory devices, embody computer program products according to the related invention.

Regarding computers for executing the logical processes set forth herein, it will be readily recognized by those skilled in the art that a variety of computers are suitable and will become suitable as memory, processing, and communications capacities of computers and portable devices increases. In such embodiments, the operative invention includes the combination of the programmable computing platform and the programs together. In other embodiments, some or all of the logical processes may be committed to dedicated or specialized electronic circuitry, such as Application Specific Integrated Circuits or programmable logic devices.

Figure 5:
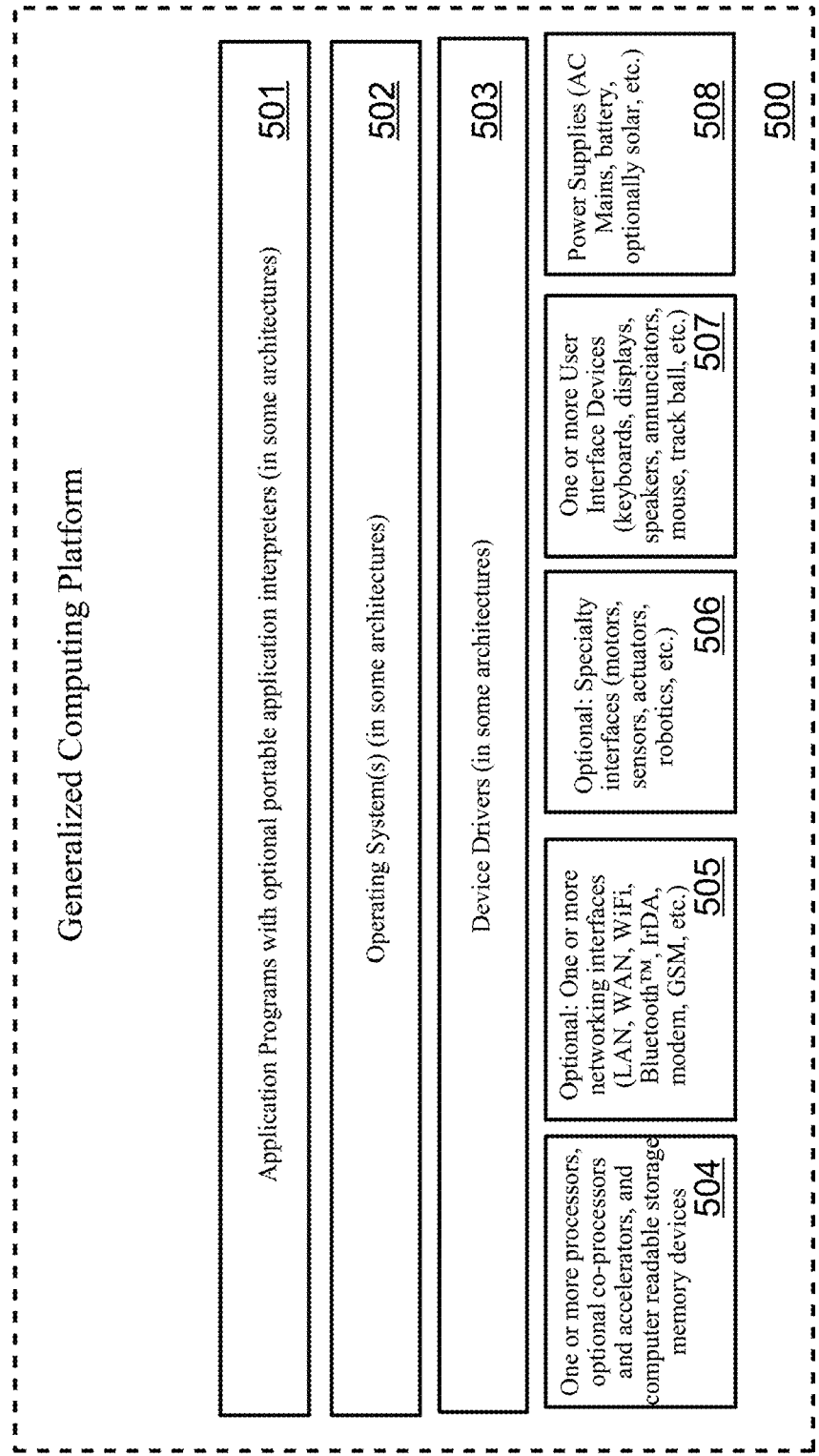
FIG. 5 sets forth a generalized architecture of computing platforms suitable for at least one embodiment of the present and the related inventions.

The present invention may be realized for many different processors used in many different computing platforms. FIG. 5 illustrates a generalized computing platform (500), such as common and well-known computing platforms such as "Personal Computers", web servers such as an IBM iSeries™ server, and portable devices such as personal digital assistants and smart phones, running a popular operating systems (502) such as Microsoft™ Windows™ or IBM™ AIX™, Palm OS™, Microsoft Windows Mobile™, UNIX, LINUX, Google Android™, Apple iPhone iOS™, and others, may be employed to execute one or more application programs to accomplish the computerized methods described herein. Whereas these computing platforms and operating systems are well known an openly described in any number of textbooks, websites, and public "open" specifications and recommendations, diagrams and further details of these computing systems in general (without the customized logical processes of the present invention) are readily available to those ordinarily skilled in the art.

Many such computing platforms, but not all, allow for the addition of or installation of application programs (501) which provide specific logical functionality and which allow the computing platform to be specialized in certain manners to perform certain jobs, thus rendering the computing platform into a specialized machine. In some "closed" architectures, this functionality is provided by the manufacturer and may not be modifiable by the end-user.

The "hardware" portion of a computing platform typically includes one or more processors (504) accompanied by, sometimes, specialized co-processors or accelerators, such as graphics accelerators, and by suitable computer readable memory devices (RAM, ROM, disk drives, removable memory cards, etc.). Depending on the computing platform, one or more network interfaces (505) may be provided, as well as specialty interfaces for specific applications. If the computing platform is intended to interact with human users, it is provided with one or more user interface devices (507), such as display(s), keyboards, pointing devices, speakers, etc. And, each computing platform requires one or more power supplies (battery, AC mains, solar, etc.).

Conclusion

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof, unless specifically stated otherwise.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

It should also be recognized by those skilled in the art that certain embodiments utilizing a microprocessor executing a logical process may also be realized through customized electronic circuitry performing the same logical process(es).

It will be readily recognized by those skilled in the art that the foregoing example embodiments do not define the extent or scope of the present invention, but instead are provided as illustrations of how to make and use at least one embodiment of the invention. The following claims define the extent and scope of at least one invention disclosed herein.

What is claimed is:

1. A method for protecting online access to collaborative resources comprising:
    generating and storing in a cache by a computing system a unique universal resource locator (URL) for addressing collaborative resource, wherein the unique URL includes a locator address portion or a domain name portion including an encrypted first user identifier thereby making the unique URL an invalid resource location which obscures an actual location of the collaborative resource;
    responsive to a first user attempting to access the collaborative resource using the unique URL resulting in execution of a resource-not-found error handler, granting by a computing system access to the collaborative resource to the first user according to the unique URL in the cache;
    disabling the unique URL by the computer system to prevent future access of the identified collaborative resource; and
    responsive to a subsequent attempt to access the collaborative resource using the unique URL, preventing by a computing system access to the collaborative resource to a subsequent requesting user.

2. The method as set forth in claim 1, further comprising:
    providing by a computing system a time criteria for accessing the unique URL; and
    responsive to detecting an elapsed time exceeding the time criteria, invalidating by a computing system the unique URL, wherein subsequent access to the collaborative resource is disabled.

3. The method as set forth in claim 1, further comprising authenticating the first user by a computing system prior to the granting of access.

4. The method as set forth in claim 1 wherein the collaborative resource comprises at least one resource selected from the group consisting of an online meeting, web conference, online chat room, an online video conference, an online audio conference, a collaboratively edited document, a collaborative browsing session, an online social networking group, and a web site.

5. The method as set forth in claim 1 further comprising providing by a computer system a collaborative resource management component that authenticates resource owners, resource invitations, and resource accesses utilizing secure communication and authentication protocols.

6. The method as set forth in claim 1 further comprising generating by a computer system the unique URL by:
    generating a dynamic private key to be later used as a salt;
    generating a hash value using a first user's system identifier, the salt, and a collaborative resource identifier, using an encryption process;
    generating the unique URL including the hash value in the locator address portion or the domain name portion; and
    caching the first user's system identifier, the salt and the collaborative resource identifier using a secure cache and using the hash value as a key into the cached elements.

7. The method as set forth in claim 6 wherein the first user's system identifier comprises at least one identifier selected from the group consisting of an electronic mail address, a telephone number, an online messaging identifier, a social networking alias name, and an employee number.

8. The method as set forth in claim 6 wherein the encryption process comprises a method compliant with a U.S. National Institute of Standards and Technology Secure Hash Algorithm specification.

9. The method as set forth in claim 6 wherein the caching the first user's system identifier comprises caching it for a limited period of time.

* * * * *